(12) United States Patent
Matsuno

(10) Patent No.: US 8,060,307 B2
(45) Date of Patent: Nov. 15, 2011

(54) VEHICLE DRIVING ASSISTANCE SYSTEM

(75) Inventor: Koji Matsuno, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 981 days.

(21) Appl. No.: 11/971,616

(22) Filed: Jan. 9, 2008

(65) Prior Publication Data

US 2008/0288140 A1 Nov. 20, 2008

(30) Foreign Application Priority Data

Jan. 11, 2007 (JP) ................................. 2007-003847

(51) Int. Cl.
*G08G 1/0969* (2006.01)
(52) U.S. Cl. ............... 701/301; 701/44; 701/77; 701/96
(58) Field of Classification Search .................... 701/41, 701/44, 301, 93, 96, 77
See application file for complete search history.

(56) References Cited

U.S. PATENT DOCUMENTS

| 6,526,352 | B1 * | 2/2003 | Breed et al. | 701/213 |
| 7,356,408 | B2 * | 4/2008 | Tsuchiya et al. | 701/211 |
| 7,472,018 | B2 * | 12/2008 | Michi et al. | 701/200 |
| 2010/0106356 | A1 * | 4/2010 | Trepagnier et al. | 701/25 |

FOREIGN PATENT DOCUMENTS

| JP | 05-052608 | 3/1993 |
| JP | 10-211886 | 8/1998 |
| JP | 2004-362227 | 12/2004 |

* cited by examiner

*Primary Examiner* — Kevin Hurley

(74) *Attorney, Agent, or Firm* — Smith, Gambrell & Russell, LLP

(57) ABSTRACT

A riskiness reference value Riskm is corrected and calculated for each target object according the a road surface friction coefficient based on a vehicle-to-target time and a collision allowance time, and a riskiness Riskm ($\Delta$Am) for each three-dimensional object is set based on the riskiness reference value Riskm with a range which uses a probability distribution given in an azimuthal angle direction where each target object exists, whereby a riskiness Risk ($\Delta$A) is set for each azimuthal angle. Then, alarming and brake controlling are made to be executed according to a riskiness Risk (0) at an azimuthal angle of 0, and a steering angle control amount $\theta$strt is obtained from the current riskiness Risk ($\Delta$A) of each azimuthal angle and an estimated riskiness Risk ($\Delta$A)e of each azimuthal angle after a set time period.

13 Claims, 11 Drawing Sheets

VEHICLE DRIVING ASSISTANCE SYSTEM

CROSS REFERENCE TO THE RELATED ARTS

The disclosure of Japanese Patent Application No. 2007-003847 filed on Jan. 11, 2007 including the specification, drawings and abstract is incorporated herein by reference in its entirety.

BACKGROUND OF THE INVENTION

The present invention relates to a vehicle driving assistance system for enhancing the safety of a vehicle by executing alarming, automatic braking and automatic steering according to environment ahead of the vehicle.

In recent years, various techniques have been developed for vehicles in which a driving environment ahead of a vehicle is detected by a camera, a laser radar system and the like which are installed on the vehicle to thereby recognize obstacles and preceding vehicles from the driving environment data so detected, so as to enhance the safety of the vehicle by executing alarming, automatic braking and automatic steering.

For example, JP-A-5-52608 discloses a technique in which riskinesses on a plurality of risk factors are calculated based on external environmental conditions, how the driver is controlling the vehicle and running conditions of the moving vehicle, a degree of emergency is calculated which is an estimated value of time required from the current point in time until the riskiness reaches a predetermined limit value, the respective risk factors are put in order of priority based on their degrees of emergency, and certain operations are performed on some of the risk factors in order of priority within a time allowance for avoiding the risk factor put in the first place in the order of priority.

In addition, JP-A-10-211886 discloses a technique in which obstacles are detected by a plurality of radars provided on the periphery of a vehicle, and a potential riskiness then is obtained based on information on a relative moving state which is made up of respective azimuthal angles, relative speeds and distances of the plurality of obstacles so detected, and a steering control is performed on the potential riskiness so obtained.

Furthermore, JP-A-2004-362227 discloses a technique in which a vehicle condition of a subject vehicle and a driving environment of the subject vehicle are detected, a risk potential is set based on a collision allowance time and an inter-vehicle time, and an acceleration pedal reaction force is controlled based on the risk potential so set.

However, in the technique disclosed in JP-A-5-52608, a limitation is imposed on the order of priority that can be taken into account, and there is a fear that an avoidance control with good accuracy cannot be performed over a long period of time. In addition, in the technique disclosed in JP-A-10-211886, a risk distribution in a two-dimensional plate needs to be treated in three-dimension, this causing a problem that the quantity of operation is increased. In addition, since the plurality of radars or the like need to be provided on the periphery of the vehicle, a problem arises that spaces necessary for provision of the plurality of radars have to be secured. Furthermore, in the technique disclosed in JP-A-2004-362227, depending upon types (attributes) of target objects, there occurs a case where a high risk is set unnecessarily, for example, for an electric-light pole on the shoulder of the road or a low risk is set for a pedestrian whose future movement is difficult to be estimated, this resulting in a problem that the risk potential cannot be set with good accuracy.

SUMMARY OF THE INVENTION

The invention is made in these situations, and an object thereof is to provide a vehicle driving assistance system in which even when there exist ahead a plurality of target objects, these target objects are put in order in a reasonable fashion, so that setting an appropriate risk can be enabled according to road surface conditions and types of obstacles and which can suppress the quantity of operation to a least level and maintain a high performance at low cost.

According to a first aspect of the invention, there is provided a vehicle driving assistance system including:

driving environment recognition means for recognizing a driving environment ahead of a subject vehicle so as to detect objects;

driving, condition detection means for detecting a driving condition of the subject vehicle;

object riskiness setting means for setting an object collision riskiness of the subject vehicle against each of the objects with a range given in an azimuthal direction where each of objects exists as the basis for the subject vehicle based on each of the objects and the driving condition; and azimuthal angle riskiness setting means for setting an azimuthal angle collision riskiness with the objects when the subject vehicle advances in each azimuthal direction based on a maximum value of the object collision riskiness in each azimuthal direction.

According to a second aspect of the invention, there is provided the vehicle driving assistance system as set forth in the first aspect, wherein the object riskiness setting means sets the object collision riskiness based on at least either of a reciprocal of a vehicle-to-target time which is calculated by dividing a distance to each of the objects by a speed of the subject vehicle and a reciprocal of a collision allowance time which is calculated by dividing a distance to each of the objects by a relative speed with each of the objects.

According to a third aspect of the invention, there is provided the vehicle driving assistance system as set forth in the first or second aspect, wherein the object riskiness setting means corrects the object collision riskiness according to a road surface friction coefficient.

According to a fourth aspect of the invention, there is provided the vehicle driving assistance system as set forth in any of the first to third aspects, wherein at least any of alarm control, automatic brake control and automatic steering control is executed based on a collision riskiness set by the azimuthal angle riskiness setting means.

According to a fifth aspect of the invention, there is provided the vehicle driving assistance system as set forth in the forth aspect, wherein the system detects riskiness least points where the azimuthal angle collision riskiness shifts from decrease to increase, and the zero points are points where the azimtuhal angle riskiness become zero on both left-hand side and right-hand side of the subject vehicle in a traveling direction thereof, and executes automatic steering control by calculating an automatic steering control amount according to a target point set by the azimuthal angle collision riskiness and an absolute value of the azimuthal angle at a point among riskiness least points and zero points detected on the left-hand side which lies nearest from the center of the subject vehicle and the azimuthal angle riskiness and an absolute value of the azimuthal angle at a point among riskiness least points and zero points detected on the right-hand side which lies nearest from the center of the subject vehicle.

According to a sixth aspect of the invention, there is provided the vehicle driving assistance system as set forth in the fifth aspect, wherein the system estimates, as an estimated object collision riskiness, the object collision riskiness of each of objects after set time period with a range given in the azimuthal angle where each of objects is estimated to exist as the basis of the subject vehicle according to the object collision riskiness and the driving condition of the subject vehicle, calculates an estimated azimuthal angle collision riskiness in each azimuthal angle according to the estimated object collision riskiness, and corrects the automatic control steering amount by the estimated azimuthal angle collision riskiness According to a seventh aspect of the invention, there is provided the vehicle driving assistance system as set forth in the sixth aspect, wherein the system sets a predetermined collision riskiness for a position which is blind from the subject vehicle based on at least the current each information of the objects.

According to an eighth aspect of the invention, there is provided the vehicle driving assistance system as set forth in the sixth or seventh aspect, wherein the system is unexecuted the automatic steering control in the event that the estimated azimuthal angle collision riskiness at the control target point becomes larger a set value than the current azimuthal angle collision riskiness.

According to a ninth aspect of the invention, there is provided the vehicle driving assistance system as set forth in any of the sixth to eighth aspects, wherein The system is unexecuted the automatic steering control in the event that the estimated azimuthal angle collision riskiness at the control target point shows a tendency to increase when the subject vehicle is steered in a direction associated with the azimuthal direction.

According to the vehicle driving assistance system of the invention, even when there exist ahead a plurality of target objects, these target objects are put in order in a reasonable fashion, so that setting an appropriate risk can be enabled according to road surface conditions and types of obstacles, the quantity of operation can be suppressed to a least level, and a high performance can be maintained at low cost.

DETAILED DESCRIPTION OF THE PREFERRED EMBODIMENTS

Hereinafter, an embodiment of the invention will be described based on the drawings.

Figure 1:
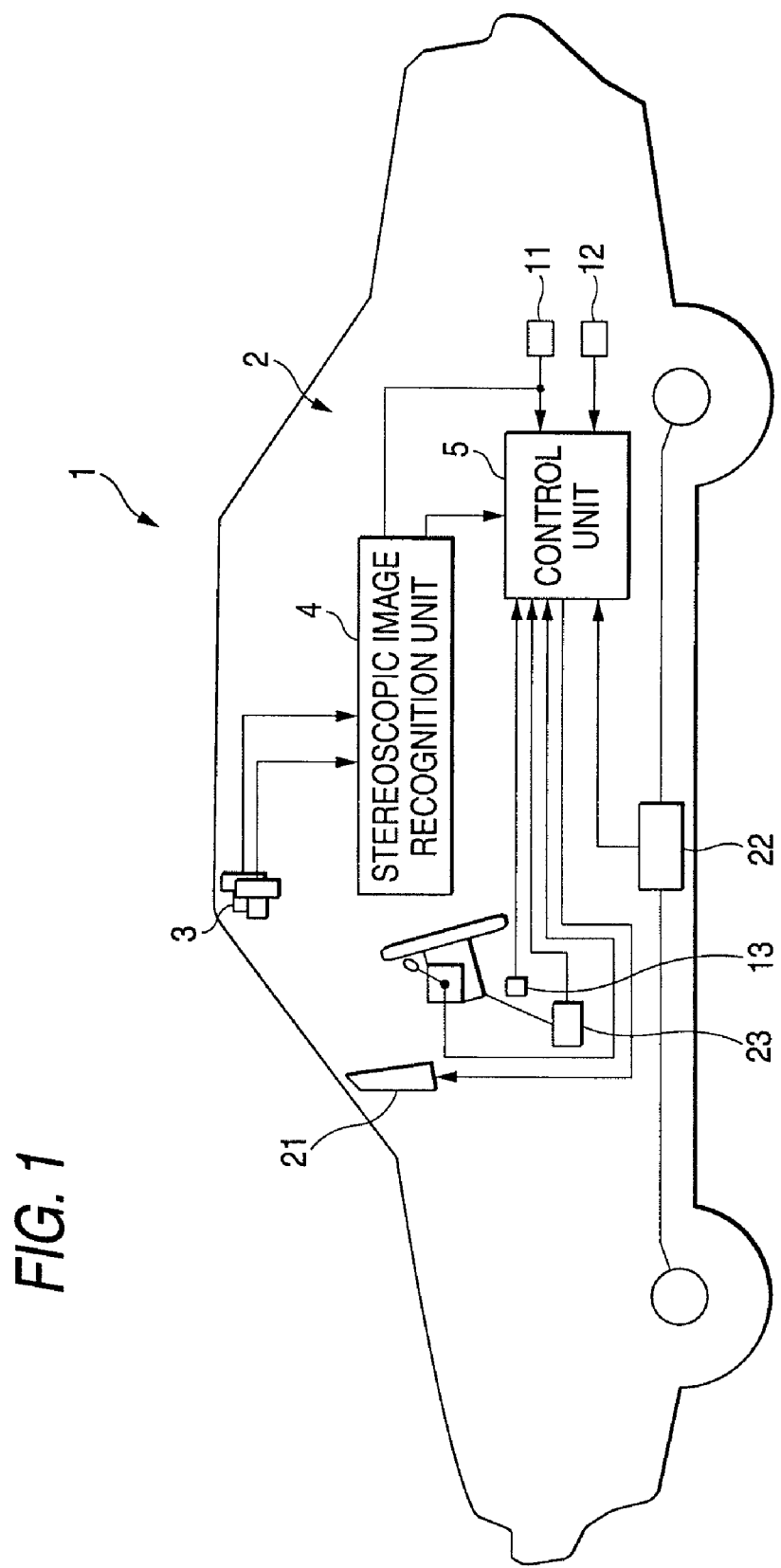
FIG. 1 is a schematic diagram showing the configuration of a driving assistance system installed on a vehicle.
Figure 2:
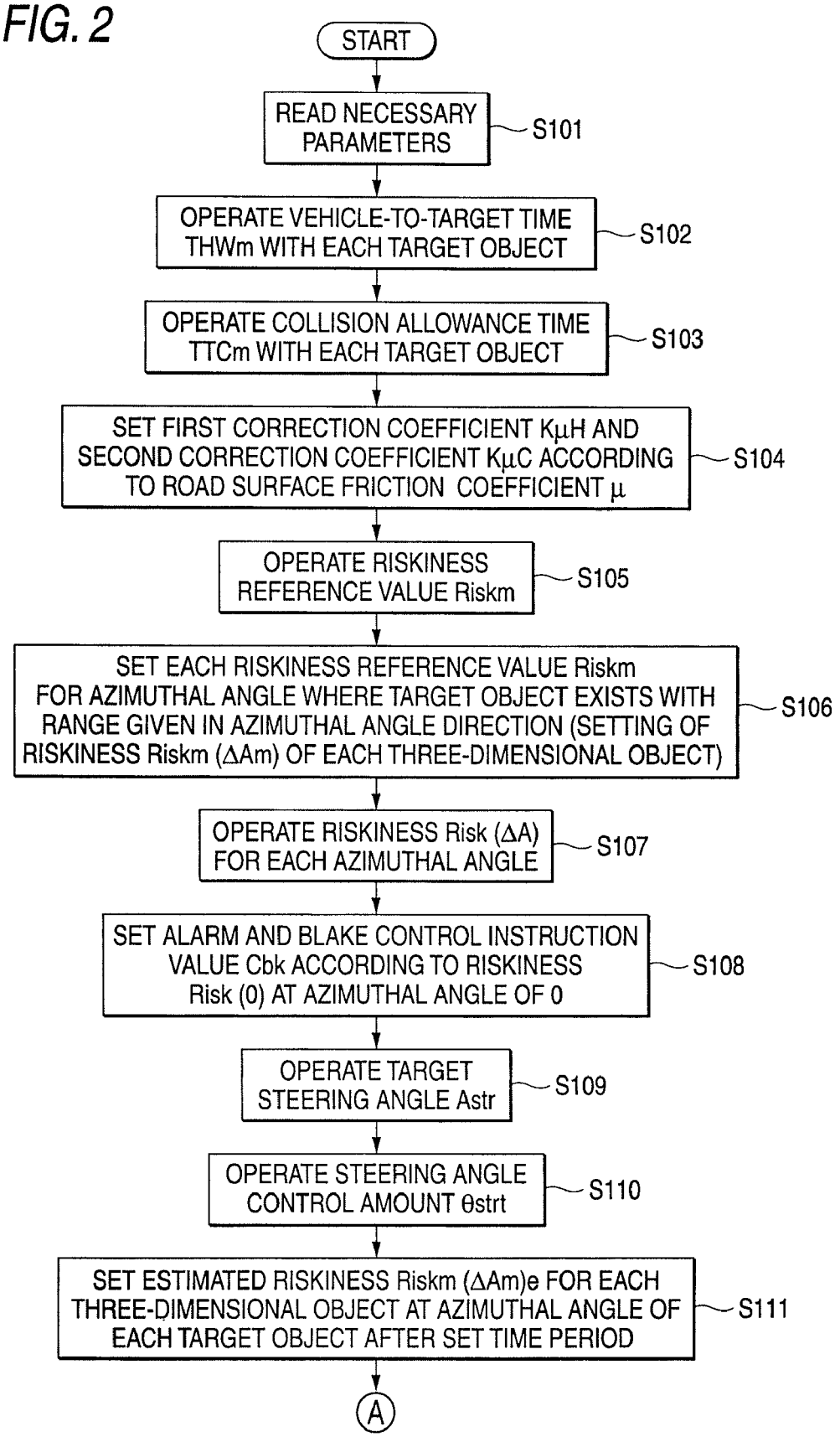
FIG. 2 is a flowchart of a driving assistance control program.
Figure 3:
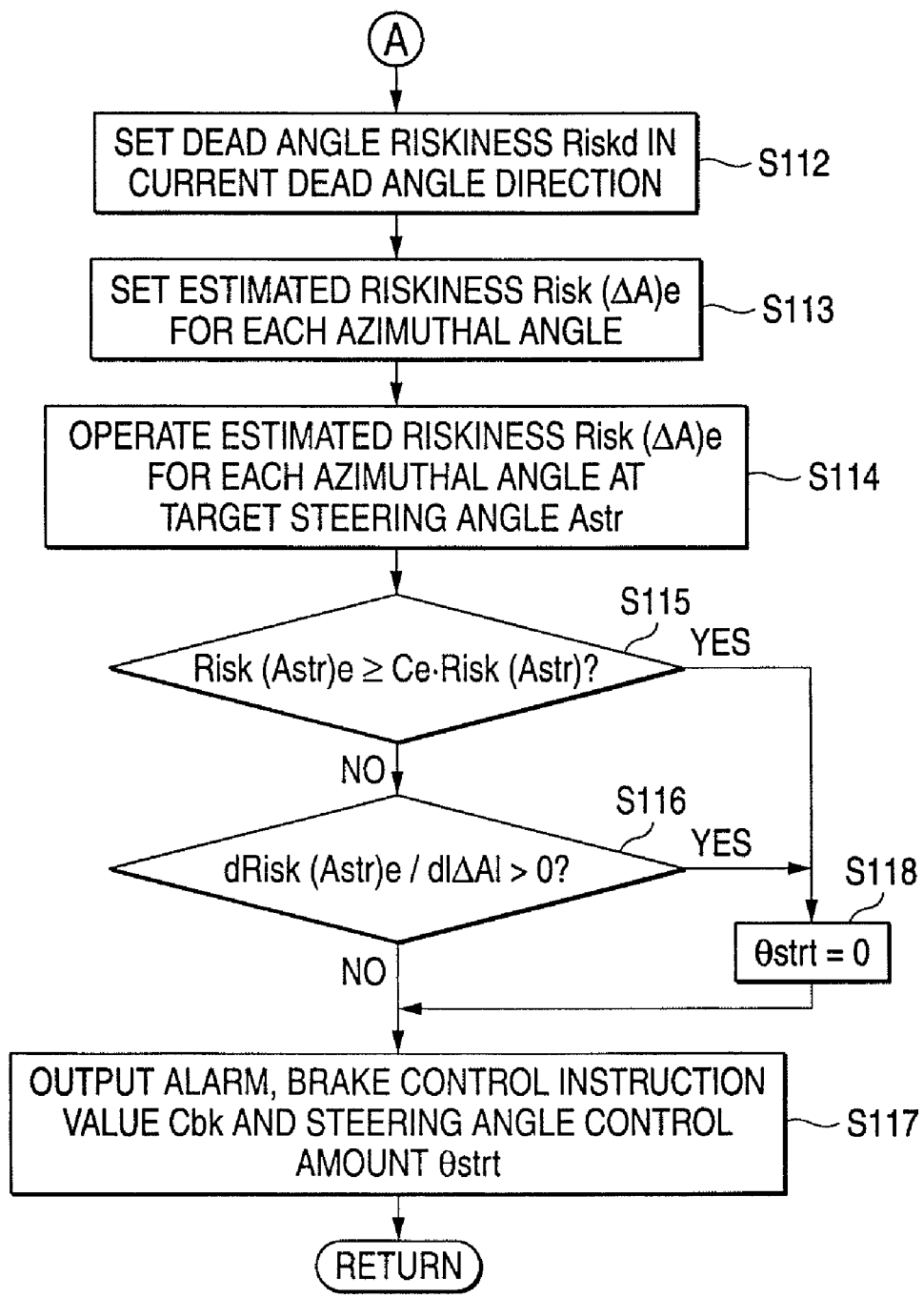
FIG. 3 is a flowchart continued from FIG. 2.
Figure 4:
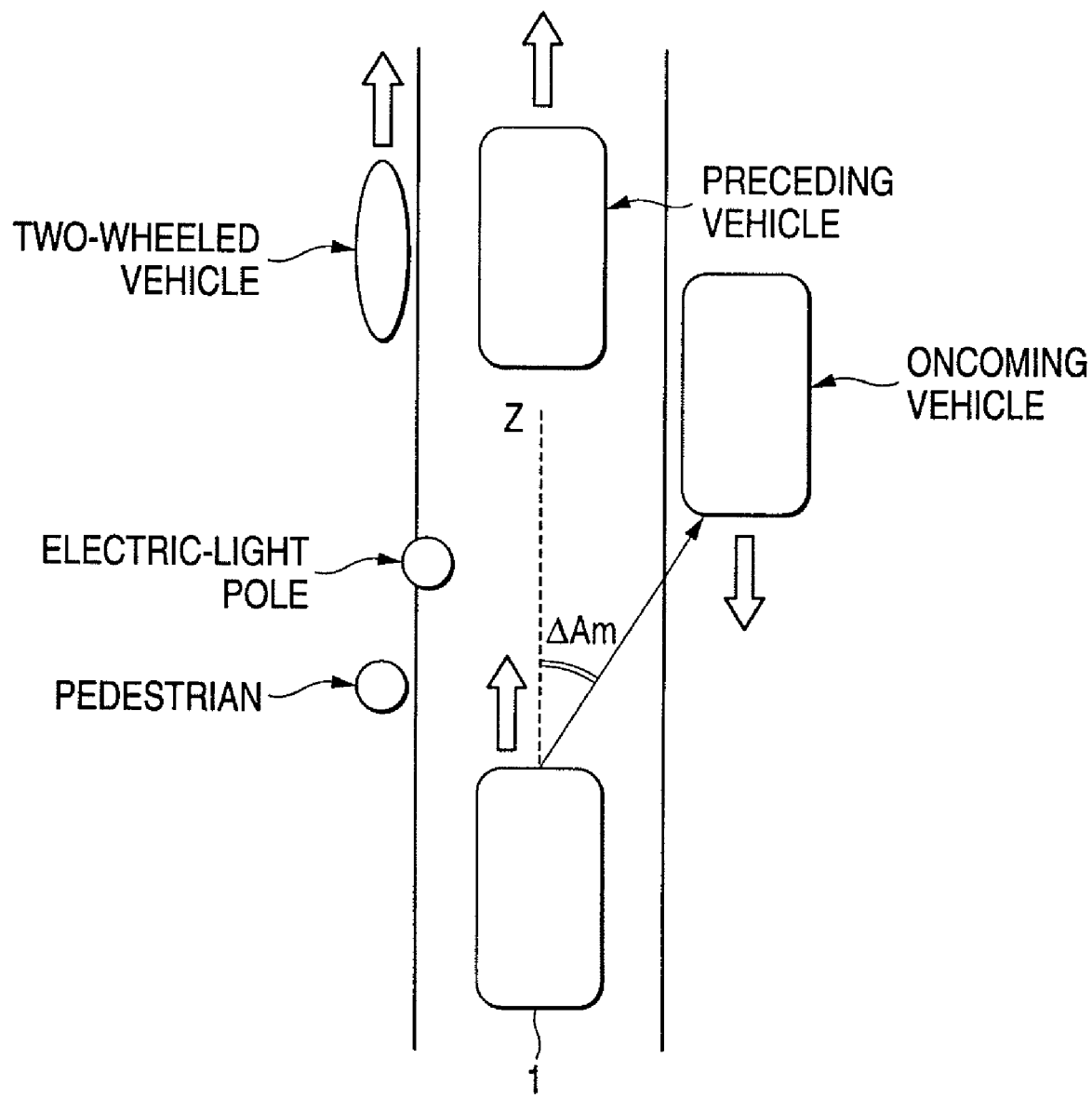
FIG. 4 is an explanatory diagram showing an example of a driving environment of the vehicle.
Figure 5:
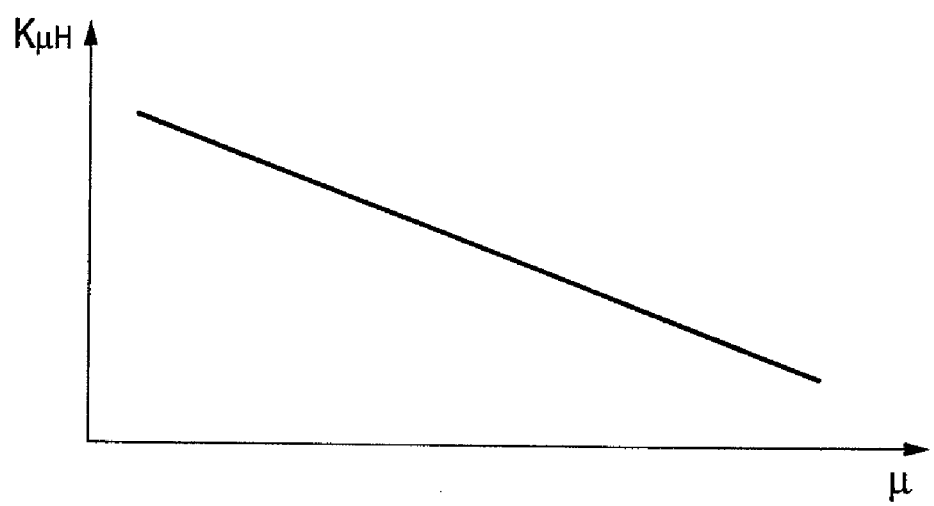
FIG. 5 is an explanatory diagram of characteristics of a first correction coefficient according to a road surface friction coefficient.
Figure 6:
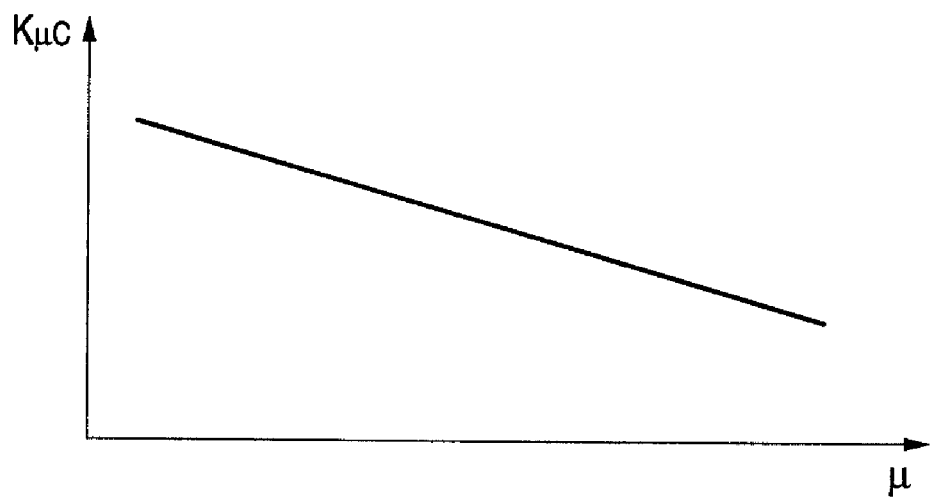
FIG. 6 is an explanatory diagram of characteristics of a second correction coefficient according to the road surface friction coefficient.
Figure 7:
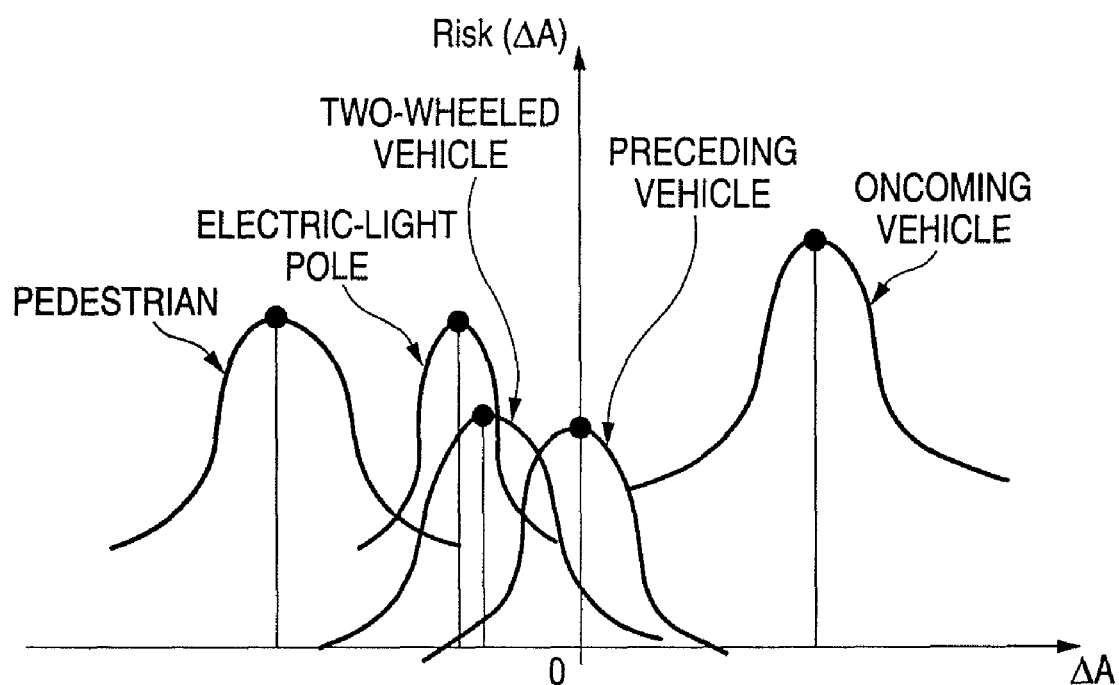
FIG. 7 is an explanatory diagram showing an example of arrangement of riskinesses for respective three-dimensional objects at their azimuthal angles.
Figure 8:
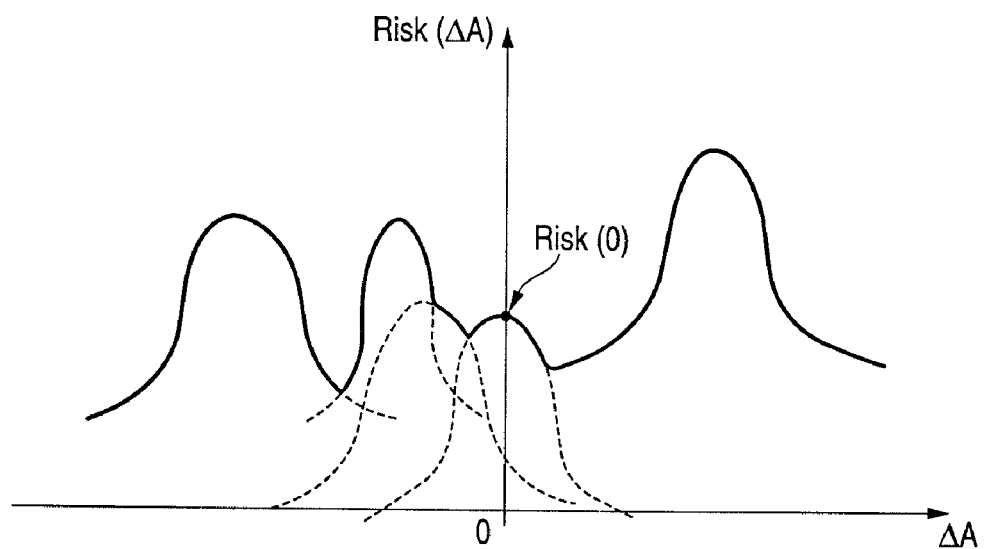
FIG. 8 is an explanatory diagram of the riskinesses at the respective azimuthal angles.
Figure 9:
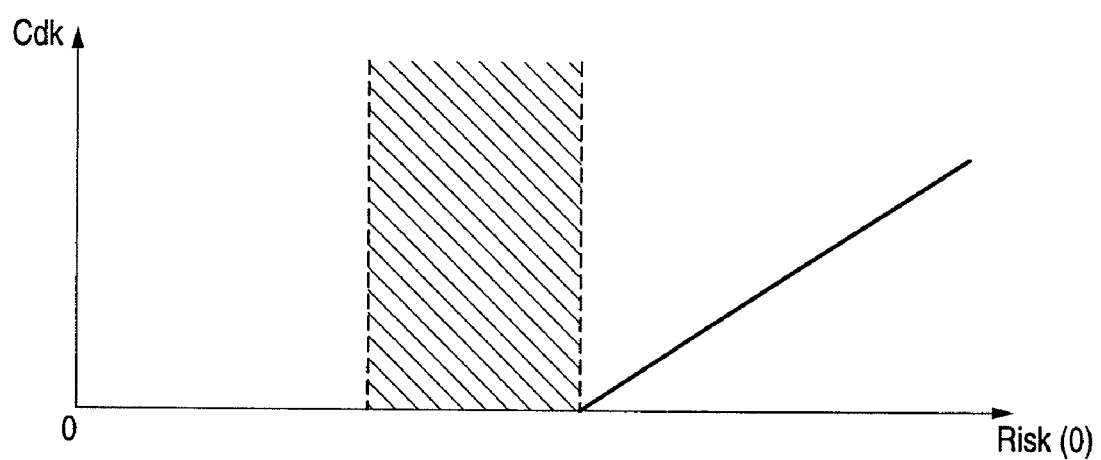
FIG. 9 is an explanatory diagram of a relationship between a riskiness in an azimuthal angle of 0 and alarm and a brake control instruction value.
Figure 10:
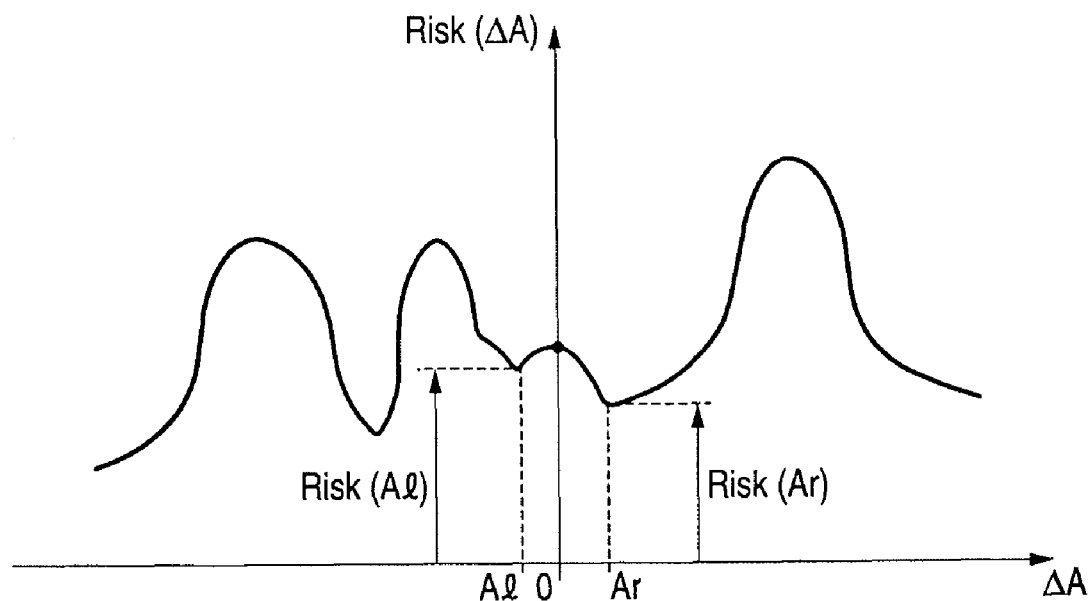
FIG. 10 is an explanatory diagram when operating a target steering angle.
Figure 11:
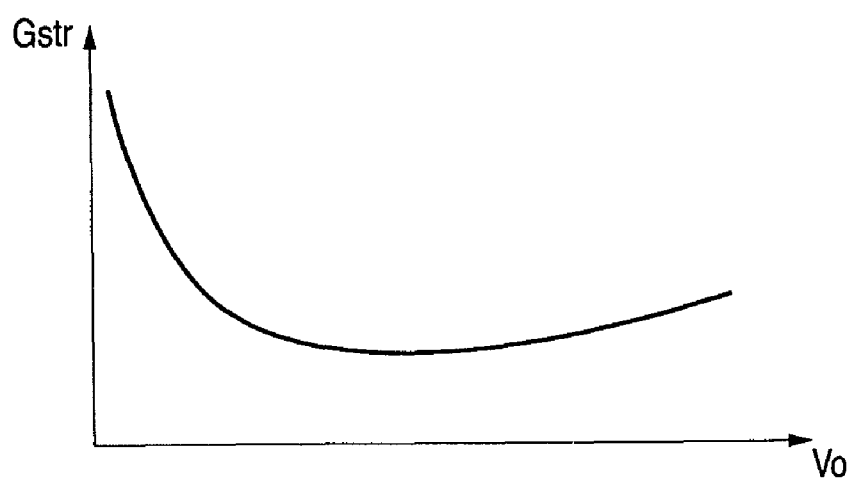
FIG. 11 is an explanatory diagram of characteristics of a steering control gain according to a vehicle speed of the subject vehicle.
Figure 12:
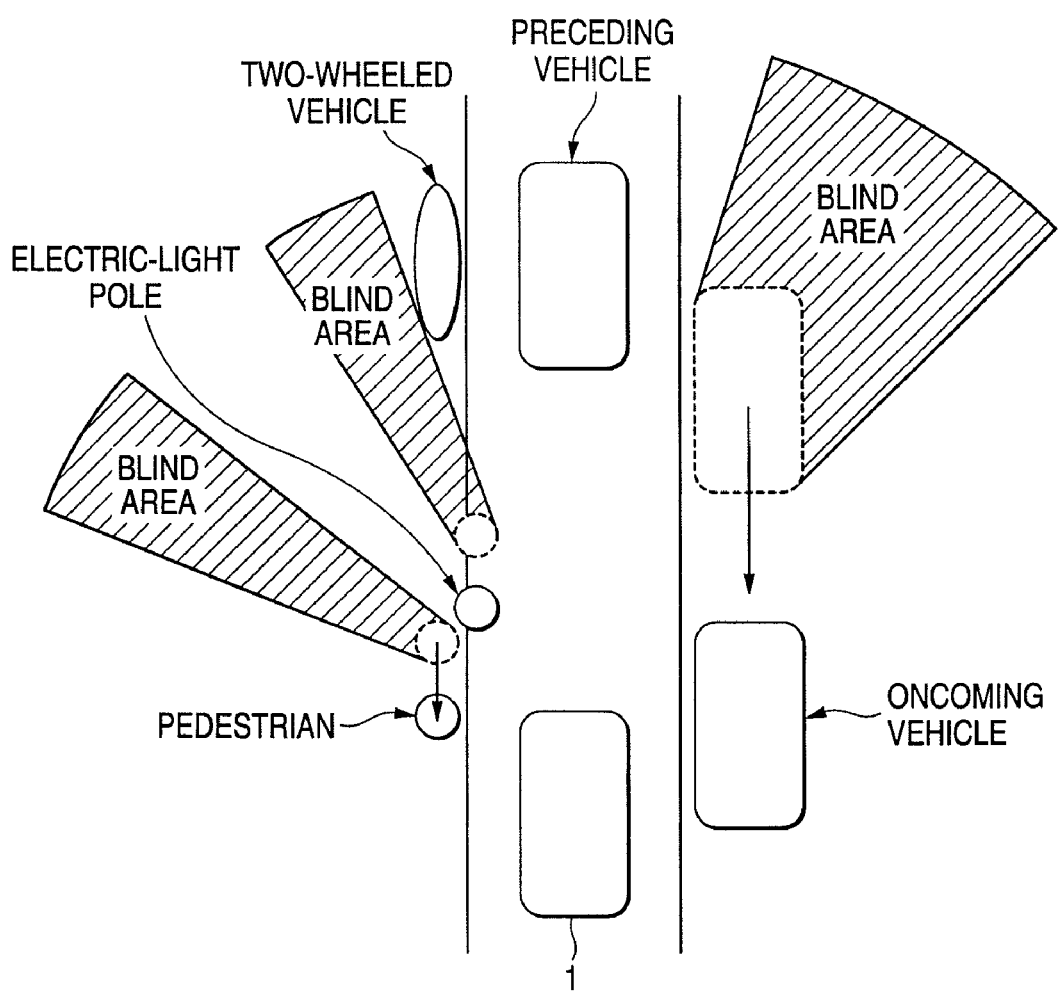
FIG. 12 is an explanatory diagram showing an example of a driving environment of the vehicle which would result after a set time period has elapsed.
Figure 13:
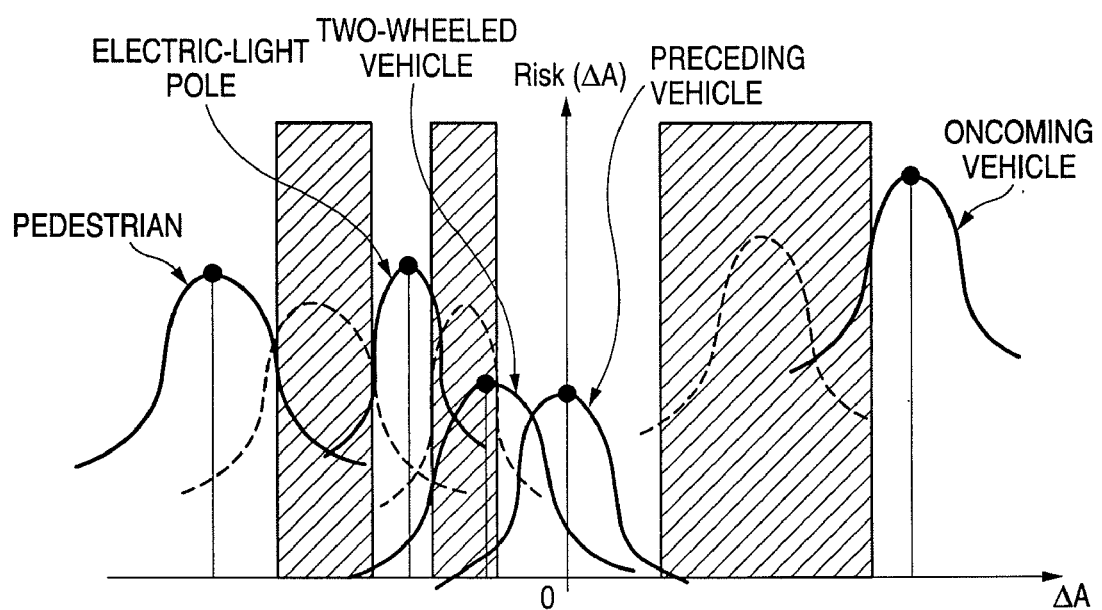
FIG. 13 is an explanatory diagram showing an example of arrangement of estimated riskinesses for the respective three-dimensional objects of the respective azimuthal angles after the set time period has elapsed.
Figure 14:
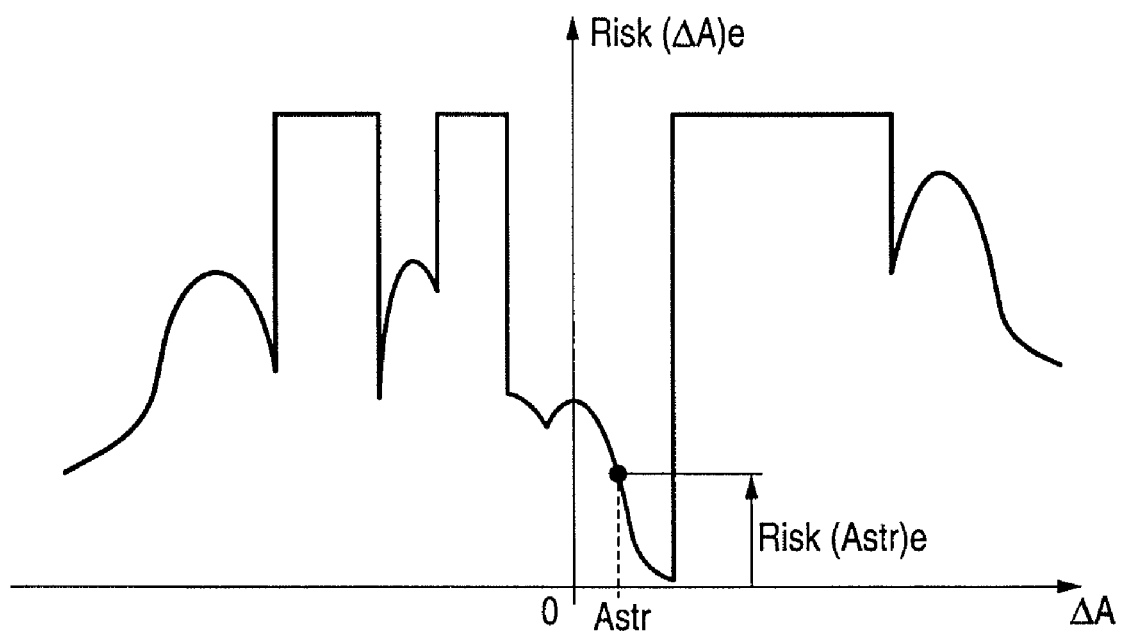
FIG. 14 is an explanatory diagram of a relationship between the estimated riskinesses of the azimuthal angles which would result after the set time period has elapsed and a target steering angle.

FIGS. 1 to 14 show an embodiment of the invention, of which FIG. 1 is a schematic diagram showing the configuration of a driving assistance system installed on a vehicle, FIG. 2 is a flowchart of a driving assistance control program, FIG. 3 is a flowchart continued from FIG. 2, FIG. 4 is an explanatory diagram showing an example of a driving environment of the vehicle, FIG. 5 is an explanatory diagram of characteristics of a first correction coefficient according to a road surface friction coefficient, FIG. 6 is an explanatory diagram of characteristics of a second correction coefficient according to the road surface friction coefficient, FIG. 7 is an explanatory diagram showing an example of arrangement of riskinesses for respective three-dimensional objects at their azimuthal angles, FIG. 8 is an explanatory diagram of the riskinesses at the respective azimuthal angles, FIG. 9 is an explanatory diagram of a relationship between a riskiness in an azimuthal angle of 0 and alarming and brake control instruction values, FIG. 10 is an explanatory diagram when operating a target steering angle, FIG. 11 is an explanatory diagram of characteristics of a steering control gain according to a vehicle speed of the subject vehicle, FIG. 12 is an explanatory diagram showing an example of a driving environment of the vehicle which would result after a set time period has elapsed, FIG. 13 is an explanatory diagram showing an example of arrangement of estimated riskinesses for the respective three-dimensional objects of the respective azimuthal angles after the set time period has elapsed, and FIG. 14 is an explanatory diagram of a relationship between the estimated riskinesses of the azimuthal angles which would result after the set time period has elapsed and a target steering angle.

In FIG. 1, reference numeral 1 denotes a vehicle such as a motor vehicle (the subject vehicle), and this vehicle 1 is equipped with a driving assistance system 2. This driving assistance system 2 is made up of a stereoscopic camera 3, a stereoscopic image recognition unit 4, a control unit 5 and the like which constitute a main part of the system.

In addition, provided on the subject vehicle 1 are a vehicle speed sensor 11 as a driving condition detection means for detecting a subject vehicle's vehicle speed V0, a road surface friction coefficient estimation unit 12 for estimating a road surface friction coefficient, a main switch 13 for outputting an ON/OFF signal to the driving assistance control so as to turn ON/OFF the driving assistance control and the like. The subject vehicle's vehicle speed V0 is inputted into the stereoscopic image recognition unit 4 and the control unit 5, while the road surface friction coefficient μ, the ON/OFF signal of the driving assistance control and the like are inputted into the control unit 5.

The stereoscopic camera 3 comprises a pair of (left and right) CCD cameras which utilizes, for example, solid state image sensing devices such as charge-coupled devices (CCDs) as a stereoscopic optical system. These left and right CCD cameras are mounted in parallel at a certain interval on the ceiling at the front of a passenger compartment, so as to capture stereoscopic images of outside the vehicle from different viewing points and input the image data into the stereoscopic image recognition unit 4.

Operations for processing of images from the stereoscopic camera 3 in the stereoscopic image recognition unit 4 are implemented, for example, in the following manner. Firstly, distance information for a pair of stereoscopic images in a traveling direction of the subject vehicle 1 which is captured by the stereoscopic camera 3 is obtained from an amount of deviation from a corresponding position, so as to produce a distance image including distance data. Then, a known grouping operation is performed based on this data, what results from the grouping operation is compared with frames (windows) such as pre-stored three-dimensional road shape data, side wall data, and three-dimensional object data, and white line data and side wall data such as guard rails, curbstones and the like are extracted while three-dimensional objects are classified into vehicle, pedestrian, and other three-dimensional objects such as electric-light pole and the like for extraction. In the three-dimensional object data, a relative speed Vrm to the subject vehicle 1 is calculated from a rate of timelike change in distance Lm of the three-dimensional object to the subject vehicle 1. In addition, by adding together this relative speed Vrm and the subject vehicle's vehicle speed V0, a speed Vm of each three-dimensional object is calculated. In addition, in particular, the three-dimensional objects which are classified as vehicles are classified into a stationary vehicle, a preceding vehicle, and an oncoming vehicle based on their speeds Vm. According to an understanding that a forward direction of the vehicle is regarded as positive, the vehicle whose speed Vm is substantially zero is classified as a stationary vehicle, the vehicle whose speed Vm is positive (the vehicle which is traveling in the same direction as the subject vehicle 1) is classified as a preceding vehicle, and the vehicle whose speed Vm is negative (the vehicle which is approaching the subject vehicle 1 from an opposite direction) is classified as an oncoming vehicle. The respective pieces of information obtained in this way, that is, the respective data including white line data, side wall data on guard rails, curbstones and the like which exist along the road and three-dimensional object data (type, distance Lm, speed Vm, relative speed Vrm to the subject vehicle 1 and the like) are inputted into the control unit 5. In this way, in the embodiment, the stereoscopic camera 3 and the stereoscopic image recognition unit 4 are provided as the driving environment recognition means.

Inputted into the control unit 5 are respective data such as a subject vehicle's vehicle speed V0 from the vehicle speed sensor 11, a road surface friction coefficient μ from the road surface friction coefficient estimation unit 12, white line data, side wall data on guard rails, curbstones and the like which exist along the road, and three-dimensional object data (class, distance Lm, speed Vm, relative speed Vrm to the subject vehicle 1 and the like) from the stereoscopic image recognition unit 4. Then, while following a driving assistance control program, which will be described later, the control unit 5 corrects and sets a riskiness reference value Riskm for the three-dimensional objects existing ahead as target objects. The riskiness reference value Riskm is calculated by correcting a reciprocal of a vehicle-to-target time THWm and a reciprocal of a collision allowance time TTCm based on the road surface friction coefficient μ. Herein the vehicle-to-target time THWm is calculated by dividing a distance Lm to each target object by the subject vehicle's vehicle speed V0. The collision allowance time TTCm is calculated by dividing the distance Lm to the each target object by the relative speed Vrm to the target object. Then, based on, the riskiness reference value Riskm, the control unit 5 sets a riskiness (a riskiness for each three-dimensional object) Riskm (ΔAm) which indicates a collision risk of the subject vehicle 1 against each target object for an azimuthal angle where each target object exists based on the subject vehicle 1 with a range which uses a probability distribution given in the azimuthal angle direction and sets a maximum value of the riskiness Riskm (ΔAm) of each three-dimensional object for the azimuthal angle as a riskiness (riskiness for each azimuthal angle) Risk (ΔA) which indicates a collision risk with the three-dimensional object when the subject vehicle 1 advances in each azimuthal angle direction. Then, an alarm is caused to be displayed by a display 21 according to a riskiness Risk (0) at an azimuthal angle of zero, and a signal is outputted to an automatic brake control unit 22 to cause the unit to execute a brake control. Note that when used herein, the "riskiness" has the same meaning as a "riskiness indicating a collision risk" or "collision riskiness" and this will be true in the following description.

In addition, a riskiness least point where the collision riskiness Risk (ΔA) of each azimuthal angle shifts from decrease to increase or remains decreased, or a point where the riskiness becomes zero is detected on both left-hand side and right-hand side of the subject vehicle about a traveling direction thereof, a control target point by an automatic steering control unit 23 is set according to a riskiness of each azimuthal angle and an absolute value of the azimuthal angle at a least point among riskiness least points and points where the riskiness becomes zero detected on the left-hand side which lies nearest from the center of the subject vehicle and a riskiness of each azimuthal angle and an absolute value of the azimuthal angle at a least point among riskiness least points and points where the riskiness becomes zero detected on the right-hand side which lies nearest from the center of the subject vehicle. Thereafter, a target steering angle Astr is set based on the control target point, and a steering angle control amount θstrt as a control amount is set based on the target steering angle Astr. As this occurs, based on estimated three-dimensional information after a set time period and the driving state of the subject vehicle 1, an estimated riskiness Riskm (ΔAm)e of each three-dimensional object after the set time period is set with a range which uses a probability distribution given in an azimuthal angle direction ΔAm where each three-dimensional object is estimated to exist based on the subject vehicle 1, and an estimated riskiness Risk (ΔA)e for each azimuthal angle is estimated based on the estimated riskiness Riskm (ΔAm)e of each three-dimensional object by taking the current dead angle (blind position) or the like into account. Then, in the event that an estimated riskiness Risk (Astr)e of each azimuthal angle at the target steering angle Astr becomes larger a set value than the current riskiness Risk (Astr) of each azimuthal angle or the estimated riskiness Risk (Astr)e of each azimuthal angle at the target steering angle Astr has a tendency to increase when the subject vehicle 1 is steered in the relevant direction, the automatic steering control is made unexecuted. Namely, the control unit 5 has functions of the three-dimensional object riskiness setting means and the azimuthal angle riskiness setting means.

Next, a driving assistance control program executed by the driving assistance system 2 will be described using flowcharts shown in FIGS. 2 and 3.

Firstly, at step (hereinafter, abbreviated as "S") 101, necessary parameters are read which are specifically the respective data including subject vehicle's vehicle speed V0, road surface friction coefficient μ, white line data, side wall data on guard rails, curbstones or the like which exist along the road, and three-dimensional object data (type, distance Lm, speed Vm, relative speed Vrm to the subject vehicle 1 and the like).

Next, the operation flow proceeds to S102, where for the three-dimensional objects existing ahead as target objects, a vehicle-to-target time THWm to each target object is calculated by the following equation (1).

$$THWm = Lm/V0 \tag{1}$$

Next, the operation flow proceeds to S103, where a collision allowance time TTCm with each target object is calculated by the following equation (2).

$$TTCm = Lm/Vrm \tag{2}$$

Next, the operation flow proceeds to S104, where referring to maps (FIGS. 5 and 6, which will be described later) which are set in advance based on experiments and calculations, a first correction coefficient KμH and a second correction coefficient KμC are set according to a road surface friction coefficient μ.

Next, the operation flow proceeds to S105, where a riskiness reference value Riskm is calculated by the following equation (3).

$$Riskm = K\mu H \cdot (1/THWm) + K\mu C \cdot (1/TTCm) \tag{3}$$

Namely, the first correction coefficient KμH is a coefficient which is used to perform a multiplication correction on a reciprocal of the vehicle-to-target time THWm, and the larger the value of the first correction coefficient KμH becomes, the larger the riskiness reference value Riskm becomes. Consequently, the characteristics of the first correction coefficient according to the road surface friction coefficient μ are, as is shown in FIG. 5, set such that as the road surface friction coefficient μ becomes lower, the first correction coefficient KμH takes a larger value.

In addition, the second correction coefficient KμC is a coefficient which is used to perform a multiplication correction on a reciprocal of TTCm, and the smaller the value of the second correction coefficient KμC becomes, the larger the riskiness reference value Riskm becomes. Consequently, the characteristics of the second correction coefficient according to the road surface friction coefficient μ are, as is shown in FIG. 6, set such that as the road surface friction coefficient μ becomes lower, the second correction coefficient KμC takes a larger value.

Next, the operation flow proceeds to S106, where a riskiness reference value Riskm is set for an azimuthal angle where each target object exists with a range given in the azimuthal angle direction (setting of a riskiness Riskm (ΔAm)).

When used herein, in the embodiment, the range is a range using a probability distribution (a regular distribution), and for example, it is such as to be give by the following equation (4).

$$Riskm\,(\Delta Am) = Riskm \cdot \exp(-(\Delta Am^2/(2 \cdot \sigma^2))) \tag{4}$$

where, σ denotes a standard deviation which is set in advance, and for example, based on a four-wheel vehicle, for a pedestrian and a two-wheeled vehicle whose moving tendencies are difficult to be estimated, a wider deviation is set, while for stationary objects such as an electric-light pole whose moving tendency is easy to be estimated, a narrower deviation is set. In addition to this, according to the detection accuracies of the stereoscopic camera 3 and the stereoscopic image recognition unit 4 which detect three-dimensional objects, the deviation is made to be set wider as the detection tolerance becomes larger.

In addition, in this embodiment, although the range of each three-dimensional object in the azimuthal angle direction is made to be represented in terms of probability distribution, in addition to this method, the range may be represented by other shapes such as a triangular shape, a rectangular parallelepiped shape and the like.

For example, in the event that a driving environment as illustrated in FIG. 4 exists, that is, a preceding vehicle (a four-wheeled vehicle) exists ahead, an oncoming vehicle (a four-wheeled vehicle) exists right forwards, a two-wheeled vehicle exists to the left of the preceding vehicle, an electric-light pole exists nearer than the two-wheeled vehicle, and furthermore, a pedestrian exists nearer than the electric-light pole, when riskinesses Riskm (ΔAm) for these three-dimensional objects are arranged based on azimuthal angles where the respective three-dimensional objects exist, what results is shown in FIG. 7.

Next, the operation flow proceeds to S107, where a riskiness Risk (ΔA) is calculated for each azimuthal angle. This riskiness is operated by setting a maximum value at each azimuthal angle which is determined based on the riskiness Riskm (ΔAm) of each three-dimensional object arranged at the azimuthal angle where the three-dimensional object exists as the riskiness Risk (ΔA) at the relevant azimuthal angle. For example, in the riskiness Riskm (ΔAm) of each three-dimensional object arranged at the azimuthal angle as is shown in FIG. 7, by taking a maximum value of each azimuthal angle, a riskiness Risk (ΔA) as shown in FIG. 8 can be obtained for each azimuthal angle.

Next, the operation flow proceeds to S108, where alarm and a brake control instruction value Cbk are set based on the riskiness Risk (ΔA) set for each azimuthal angle at S107 according to a traveling direction of the subject vehicle, that is, a riskiness Risk (0) at an azimuthal angle of "0".

The setting of the alarm and the brake control instruction value Cbk is set by a map as shown in FIG. 9 which is set in advance. In the map shown in FIG. 9, a region shaded with oblique lines is set for a region where only alarming is performed, and when the riskiness Risk (0) at the azimuthal angle of "0" reaches or exceeds a set value, in addition to alarming, the brake control instruction value Cbk is set to gradually increase.

Next, the operation flow proceeds to S109, where the calculation of a target steering angle Astr is executed. This is done in such a way as is shown in FIG. 10, for example. Specifically, a riskiness least point where the collision riskiness Risk (ΔA) of each azimuthal angle shifts from decrease to increase or remains decreased, or a point where the riskiness becomes zero is detected on both left-hand side and right-hand side of the subject vehicle about a traveling direction thereof, and a riskiness Risk (Al) of each azimuthal angle and an absolute value |Al| of the azimuthal angle at a least point among riskiness least points and points where the riskiness becomes zero detected on the left-hand side which lies nearest from the center of the subject vehicle and a riskiness Risk (Ar) of each azimuthal angle and an absolute value

|Ar| of the azimuthal angle at a least point among riskiness least points and points where the riskiness becomes zero detected on the right-hand side which lies nearest from the center of the subject vehicle are obtained. Then, a target steering angle Astr is set by the following equation (5) or (6).

$$\text{when Risk }(Ar)\cdot|Ar|\leq \text{Risk }(A1)\cdot|A1|, Astr=Ar \quad (5)$$

$$\text{when Risk }(Ar)\cdot|Ar|> \text{Risk }(A1)\cdot|A1|, Astr=A1 \quad (6)$$

Namely, a point where the control amount by the automatic steering unit 23 becomes small and the riskiness of the azimuthal angle becomes small is set as the target steering angle Astr.

Next, the operation flow proceeds to S110, where a steering angle control amount θstrt is set based on the target steering angle Astr by the following equation (7).

$$\theta strt = Gstr\cdot Astr \quad (7)$$

where, Gstrt denotes a steering control gain, and for example, as is shown in FIG. 11, this is set by a map which is set in advance according to the subject vehicle's vehicle speeds V0.

Next, the operation flow proceeds to S111, and based on estimated three-dimensional object information after a set time period and the driving condition of the subject vehicle 1, an estimated riskiness Riskm (ΔAm)e of each three-dimensional object after the set time period is set with a range which uses a probability distribution given in an azimuthal angle direction where each three-dimensional object is estimated to exist based on the subject vehicle 1. For example, in the event that the current positions of the respective three-dimensional objects shown in FIG. 4 change as is shown in FIG. 12 relative to the subject vehicle 1 after the set time period, the estimated riskiness Riskm (ΔAm)e of each three-dimensional object is provided as indicated by a solid line in FIG. 13. In addition, what is indicated bya broken line is the current riskiness Riskm (ΔAm)of each three-dimensional object.

Next, the operation flow proceeds to S112, in the estimated riskiness Riskm (ΔAm)e of each three-dimensional object, a large riskiness (a dead angle riskiness Riskd) which has been set in advance is set for a portion which is blind or constitutes a dead angle in the current riskiness Riskm (ΔAm) of each three-dimensional object. Shown in FIG. 12 are an example of blind areas or dead angles in the current driving environment, and FIG. 13 shows an example in which those blind areas or dead angles are shown together with the estimated riskinesses (ΔAm)e of the respective three-dimensional objects.

Then, the operation flow proceeds to S113, where Risk (ΔA)e is calculated by setting a maximum value of each azimuthal angle that is determined based on the estimated riskiness Riskm (ΔAm)e that is formed at S112 in a similar manner to that at S107 as an estimated riskiness Risk (ΔA)e for the relevant azimuthal angle (refer to FIG. 14).

Then, the operation flow proceeds to S114, and an estimated riskiness Risk (Astr) e of each azimuthal angle at the target steering angle Astr which is operated at S109 is operated.

Next, the operation flow proceeds to S115, where an estimated riskiness Risk (Astr) of each azimuthal angle at a target steering angle Astr which would result after the set time period is compared with a value (Ce·Risk (Astr)) which results by multiplying the riskiness Risk (Astr) of each azimuthal angle at the current steering angle Astr by a constant Ce (for example, 1.2). As a result of the comparison, when Risk (Astr)e<Ce·Risk (Astr), the operation flow proceeds further to S116 for determination, where whether or not a change gradient of the estimated riskiness Risk (Astr)e of each azimuthal angle at the target steering angle Astr which would result after the set time period is positive relative to an increase in the absolute value of the azimuthal angle is determined (drisk (Astr)e/d|ΔA|>0, that is, whether or not the estimated riskiness Risk (Astr)e of each azimuthal angle at the target steering angle Astr after the set time period has a tendency to increase when the subject vehicle 1 is steered in the relevant direction is determined. Then, in the event that it is determined that dRisk (Astr)e/d|ΔA|≦0 and that the estimated riskiness Risk (Astr)e of each azimuthal angle at the target steering angle Astr does not increase even when the subject vehicle 1 is steered in the relevant direction, the operation flow then proceeds to S117.

On the other hand, in the event that the determination at S115 determines that Risk (Astr)e≧Ce·Risk (Astr), that is, the estimated riskiness Risk (Astr)e of each azimuthal angle at the target steering angle Astr after the set time period is equal to or larger than the value (Ce·Risk (Astr)) which results by multiplying the riskiness Risk (Astr) of each azimuthal angle at the current steering angle Astr by a constant Ce (for example, 1.2) or that the determination at S116 determines that dRisk (Astr)e/d|ΔA|>0 and that the estimated riskiness Risk (Astr)e of each azimuthal angle at the target steering angle Astr after the set time period has a tendency to increase when the subject vehicle 1 is steered in the relevant direction, the operation flow then proceeds to S118, where the steering angle control amount θstrt is set to "0", that is, the automatic steering control is made unexecuted, the operation flow proceeding to S117.

Note that in an example shown in FIG. 14, since Risk (Astr)e<Ce·Risk (Astr) and dRisk (Astr)e/d|ΔA|<0, the operation flow proceeds directly to S117 to output the steering control value θstrt which is set in S110.

Then, at S117, the alarm, the brake control instruction value Cbk and the steering angle control amount θstrt, which are set at S108 are outputted to the display 21, the automatic brake control unit 22 and the automatic steering control unit 23, respectively. The operation flow exits the program.

Thus, according to the embodiment of the invention, the riskiness reference value Riskm is corrected and operated for each target object according to the road surface friction coefficient μ based on the vehicle-to-target time THWm and the collision allowance time TTCm, the riskiness Riskm (ΔAm) of each three-dimensional object is set for the azimuthal angle where each target object exists based on the riskiness reference value Riskm with the range which uses the probability distribution given in the azimuthal angle direction, and the maximum value of the riskiness Riskm (ΔAm) of each three-dimensional object set for each azimuthal angle is set as the riskiness Risk ((ΔA) of each azimuthal angle. Then, according to the riskiness Risk (0) at the azimuthal angle of 0, the alarm is caused to be displayed and the brake control is executed. Furthermore, the riskiness least point where the collision riskiness Risk (ΔA) of each azimuthal angle shifts from decrease to increase or remains decreased, or the point where the riskiness becomes zero is detected on both left-hand side and right-hand side of the subject vehicle about the traveling direction thereof, the control target point by the automatic steering control unit 23 is set according to the riskiness of each azimuthal angle and the absolute value of the azimuthal angle at the least point among the riskiness least points and the points where the riskiness becomes zero detected on the left-hand side which lies nearest from the center of the subject vehicle and the riskiness of each azimuthal angle and the absolute value of the azimuthal angle at the least point among the riskiness least points and the points where the riskiness becomes zero detected on the right-hand side which lies nearest from the center of the subject vehicle. Thereafter, the target steering angle Astr is set based on the control target point so set, and the steering angle control amount θstrt is set based on the target steering angle Astr so set. As this occurs, based on the estimated three-dimensional information after the set time period and the driving state of the subject vehicle 1, the estimated riskiness Riskm (ΔAm)e of each three-dimensional object after the set time period is set with the range which uses the probability distribution given in the azimuthal angle direction ΔAm where each three-dimensional object is estimated to exist based on the subject vehicle 1, and the estimated riskiness Risk (ΔA)e for each azimuthal angle is estimated based on the estimated riskiness Riskm (ΔAm)e of each three-dimensional object by taking the current dead angle or the like into account. Then, in the event that the estimated riskiness Risk (Astr)e of each azimuthal angle at the target steering angle Astr becomes by the set value or more than the current riskiness Risk (Astr) of each azimuthal angle or the estimated riskiness Risk (Astr)e of each azimuthal angle at the target steering angle Astr has a tendency to increase when the subject vehicle 1 is steered in the relevant direction, the automatic steering control is made unexecuted.

Because of this, even when there exist ahead a plurality of target objects, these target objects are put in order in a reasonable fashion, so that setting an appropriate risk can be enabled according to road surface conditions and types of obstacles, the quantity of operation can be suppressed to a least level, and a high performance can be maintained at low cost.

Note that while in the embodiment, three of alarming, brake controlling and automatic steering controlling are described as being implemented, only any one or two of the three may be made to be implemented.

What is claimed is:

1. A vehicle driving assistance system comprising:
   driving environment recognition means for recognizing a driving environment ahead of a subject vehicle so as to detect objects;
   driving condition detection means for detecting a driving condition of the subject vehicle;
   object riskiness setting means for setting an object collision riskiness of the subject vehicle against each of the objects with a range given in an azimuthal direction where each of objects exists as the basis for the subject vehicle based on each of the objects and the driving condition; and
   azimuthal angle riskiness setting means for setting an azimuthal angle collision riskiness with the objects when the subject vehicle advances in each azimuthal direction based on a maximum value of the object collision riskiness in each azimuthal direction, and wherein the object riskiness setting means corrects the object collision riskiness according to a road surface friction coefficient.

2. The vehicle driving assistance system as set forth in claim 1, wherein the object riskiness setting means sets the object collision riskiness based on at least either of a reciprocal of a vehicle-to-target time which is calculated by dividing a distance to each of the objects by a speed of the subject vehicle and a reciprocal of a collision allowance time which is calculated by dividing a distance to each of the objects by a relative speed with each of the objects.

3. The vehicle driving assistance system according to claim 1, wherein at least any of alarm control, automatic brake control and automatic steering control is executed based on the azimuthal angle collision riskiness.

4. The vehicle driving assistance system according to claim 3, wherein the system detects riskiness least points where the azimuthal angle collision riskiness shifts from decrease to increase, and the zero points are points where the azimtuhal angle riskiness become zero on both left-hand side and right-hand side of the subject vehicle in a traveling direction thereof, and
   executes automatic steering control by calculating an automatic steering control amount according to a target point set by the azimuthal angle collision riskiness on the left-hand side and an absolute value of the azimuthal angle on the left-hand side at a point among riskiness least points and zero points detected on the left-hand side which lies nearest from the center of the subject vehicle, and the azimuthal angle collision riskiness on the right-hand side and an absolute value of the azimuthal angle on the right-hand side at a point among riskiness least points and zero points detected on the right-hand side which lies nearest from the center of the subject vehicle.

5. The vehicle driving assistance system according to claim 4, wherein the system estimates, as an estimated object collision riskiness, the object collision riskiness of each of objects after set time period with a range given in the azimuthal angle where each of objects is estimated to exist as the basis of the subject vehicle according to the object collision riskiness and the driving condition of the subject vehicle,
   calculates an estimated azimuthal angle collision riskiness in each azimuthal angle according to the estimated object collision riskiness, and
   corrects the automatic control steering amount by the estimated azimuthal angle collision riskiness.

6. The vehicle driving assistance system according to claim 5, wherein the system sets a predetermined collision riskiness for a position which is blind from the subject vehicle based on at least the current each information of the objects.

7. The vehicle driving assistance system according to claim 5, wherein the system is unexecuted the automatic steering control in the event that the estimated azimuthal angle collision riskiness at the control target point becomes larger a set value than the current azimuthal angle collision riskiness.

8. The vehicle driving assistance system according to claim 5, wherein the system is unexecuted the automatic steering control in the event that the estimated azimuthal angle collision riskiness at the control target point shows a tendency to increase when the subject vehicle is steered in a direction associated with the azimuthal direction.

9. A vehicle driving assistance system comprising:
   driving environment recognition means for recognizing a driving environment ahead of a subject vehicle so as to detect objects;
   driving condition detection means for detecting a driving condition of the subject vehicle;
   object riskiness setting means for setting an object collision riskiness of the subject vehicle against each of the objects with a range given in an azimuthal direction where each of objects exists as the basis for the subject vehicle based on each of the objects and the driving condition; and
   azimuthal angle riskiness setting means for setting an azimuthal angle collision riskiness with the objects when the subject vehicle advances in each azimuthal direction based on a maximum value of the object collision riskiness in each azimuthal direction, wherein
   at least any of alarm control, automatic brake control and automatic steering control is executed based on the azimuthal angle collision riskiness, and wherein the system detects riskiness least points where the azimuthal angle collision riskiness shifts from decrease to increase, and the zero points are points where the azimtuhal angle riskiness become zero on both left-hand side and right-hand side of the subject vehicle in a traveling direction thereof, and executes automatic steering control by calculating an automatic steering control amount according to a target point set by the azimuthal angle collision riskiness on the left-hand side and an absolute value of the azimuthal angle on the left-hand side at a point among riskiness least points and zero points detected on the left-hand side which lies nearest from the center of the subject vehicle, and the azimuthal angle collision riskiness on the right-hand side and an absolute value of the azimuthal angle on the right-hand side at a point among riskiness least points and zero points detected on the right-hand side which lies nearest from the center of the subject vehicle.

10. The vehicle driving assistance system as set forth in claim 9, wherein the system estimates, as an estimated object collision riskiness, the object collision riskiness of each of objects after set time period with a range given in the azimuthal angle where each of objects is estimated to exist as the basis of the subject vehicle according to the object collision riskiness and the driving condition of the subject vehicle, calculates an estimated azimuthal angle collision riskiness in each azimuthal angle according to the estimated object collision riskiness, and corrects the automatic control steering amount by the estimated azimuthal angle collision riskiness.

11. The vehicle driving assistance system as set forth in claim 10, wherein the system sets a predetermined collision riskiness for a position which is blind from the subject vehicle based on at least the current each information of the objects.

12. The vehicle driving assistance system as set forth in claim 10, wherein the system is unexecuted the automatic steering control in the event that the estimated azimuthal angle collision riskiness at the control target point becomes larger a set value than the current azimuthal angle collision riskiness.

13. The vehicle driving assistance system as set forth in claim 10, wherein the system is unexecuted the automatic steering control in the event that the estimated azimuthal angle collision riskiness at the control target point shows a tendency to increase when the subject vehicle is steered in a direction associated with the azimuthal direction.

* * * * *